United States Patent
Kita (10) Patent No.: US 8,154,750 B2
(45) Date of Patent: Apr. 10, 2012

(54) IMAGE FORMING APPARATUS AND JOB INFORMATION MANAGEMENT METHOD

(75) Inventor: Koji Kita, Machida (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 1031 days.

(21) Appl. No.: 12/098,268

(22) Filed: Apr. 4, 2008

(65) Prior Publication Data

US 2008/0304100 A1 Dec. 11, 2008

(30) Foreign Application Priority Data

Jun. 7, 2007 (JP) .................................. 2007-151596

(51) Int. Cl.
G06F 3/12 (2006.01)
G06K 15/00 (2006.01)

(52) U.S. Cl. ...................... 358/1.15; 358/1.13; 358/1.16

(58) Field of Classification Search .................... 358/1.1, 358/1.9, 1.13, 1.14, 1.15, 1.16, 1.17, 1.18, 358/400, 401, 407, 468
See application file for complete search history.

(56) References Cited

U.S. PATENT DOCUMENTS

2003/0011800 A1* 1/2003 Miyahara et al. ............ 358/1.13

FOREIGN PATENT DOCUMENTS

| JP | 2003-332097 | 11/2003 |
|---|---|---|
| JP | 2004102873 | 4/2004 |
| JP | 2004-178325 A | 6/2004 |
| JP | 2005-092498 | 4/2005 |
| JP | 2005-242742 | 9/2005 |
| JP | 2007-58658 | 3/2007 |
| JP | 2007-102416 | 4/2007 |

OTHER PUBLICATIONS

Office Action dated Aug. 30, 2011 issued in corresponding JP Application No. 2007-151596 and English-language translation thereto, 7 pps.
Decision of Refusal in corresponding JP Application No. 2007-151596 dated Jan. 20, 2012 with English-language translation, 5 pages.

* cited by examiner

*Primary Examiner* — Dov Popovici (74) *Attorney, Agent, or Firm* — Buchanan Ingersoll & Rooney PC

(57) ABSTRACT

Disclosed is an image forming apparatus, including: a first storage section to store a plurality of pieces of job information each having a plurality of data items corresponding to a plurality of items; a second storage section to store read-out definition information in which one or more of the items to be read out from each of the pieces of job information are set; an input section to input an instruction to read out one or more of the pieces of job information; and a control section to extract one or more of the data items corresponding to one or more of the items set in the read-out definition information from each of the one or more of the pieces of job information when the instruction is inputted by the input section, and to output the extracted one or more of the data items.

16 Claims, 6 Drawing Sheets

| JOB HISTORY DATA | ITEM NUMBER | | | | | | | | |
|---|---|---|---|---|---|---|---|---|---|
| | 01 | 02 | 03 | 04 | ... | 97 | 98 | 99 | ... |
| JOB HISTORY DATA 1 | 1 | 100 | 10 | 0 | ... | 10 | 27 | 1 | ... |
| JOB HISTORY DATA 2 | 2 | 5 | 3 | 0 | ... | 10 | 55 | 1 | ... |
| JOB HISTORY DATA 3 | 3 | 1 | 12 | 0 | ... | 10 | 59 | 1 | ... |
| POWER OFF | 0 | 0 | 0 | 2 | ... | 0 | 0 | 1 | ... |
| POWER ON | 0 | 0 | 0 | 1 | ... | 11 | 50 | 1 | ... |
| JOB HISTORY DATA 4 | 4 | 40 | 1 | 0 | ... | 12 | 10 | 1 | ... |
| | | | | | | | | | |
| JOB HISTORY DATA N | N | 8 | 100 | 0 | ... | 15 | 50 | 1 | ... |

IMAGE FORMING APPARATUS AND JOB INFORMATION MANAGEMENT METHOD

BACKGROUND OF THE INVENTION

1. Field of the Invention

The present invention relates to an image forming apparatus and a job information management method.

2. Description of Related Art

There has been recently known an image forming apparatus such as a printer, a scanner, a facsimile, a copying machine and a MFP (Multi Function Peripheral) having various functions such as an image forming function, a copying function, a scan function, a facsimile function, etc. of the above machines.

Information of jobs executed by an image forming apparatus (hereinafter referred to "job information") is managed for the purpose of storing job information of a job whose execution has been completed into a memory, tabulating the job information according to an application specified by a user or a predetermined item, and displaying the tabulated result or a history of the job information.

For example, JP-A-2004-178325 discloses a job account server which manages job information outputted to printers from a client computer. In the job account server, at first, a tabulation item for tabulating job information is set, and job information is obtained from job information recorded in a job log recording section based on the tabulation item. Then, history information included in the obtained job information is tabulated, and the tabulated result of the tabulated history information is outputted to the client computer.

According to JP-A-2004-178325, the job information is stored in an external device which is provided outside the image forming apparatus, and the external device manages the job information. In recent years, since job information comprises huge items, capacity of one piece of job information is large. Therefore, there is a problem that a communication load increases when job information is transmitted and written into an external device through a network. Furthermore, when job information is read out from the external device, job information of all items containing some unnecessary items for a user is read out, and thus there is a problem that an unnecessary communication load occurs.

SUMMARY OF THE INVENTION

It is, therefore, a main object of the present invention to reduce a communication load when job information is read out and to increase a speed of reading out the job information.

To achieve at least one of the above objects, an image processing apparatus reflecting a first aspect of the present invention comprises: a first storage section to store a plurality of pieces of job information each having a plurality of data items corresponding to a plurality of items; a second storage section to store read-out definition information in which one or more of the items to be read out from each of the pieces of job information are set; an input section to input an instruction to read out one or more of the pieces of job information; and a control section to extract one or more of the data items corresponding to one or more of the items set in the read-out definition information from each of the one or more of the pieces of job information when the instruction is inputted by the input section, and to output the extracted one or more of the data items.

According to a second aspect of the present invention, there is provided a management method of job information in an image forming apparatus including a first storage section to store a plurality of pieces of job information each having a plurality of data items corresponding to a plurality of items and a second storage section to store read-out definition information in which one or more of the items to be read out from each of the pieces of job information are set, the management method, comprising: accepting an instruction to read out one or more of the pieces of job information; extracting one or more of the data items corresponding to one or more of the items set in the read-out definition information from each of the one or more of the pieces of job information by referring the read-out definition information stored in the second storage section when the instruction is accepted; and outputting the extracted one or more of the data items.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein.

DESCRIPTION OF THE PREFERRED EMBODIMENTS

Preferred embodiments of the present invention will be described with reference to the drawings.

First, a configuration in the present embodiments will be described below.

Figure 1:
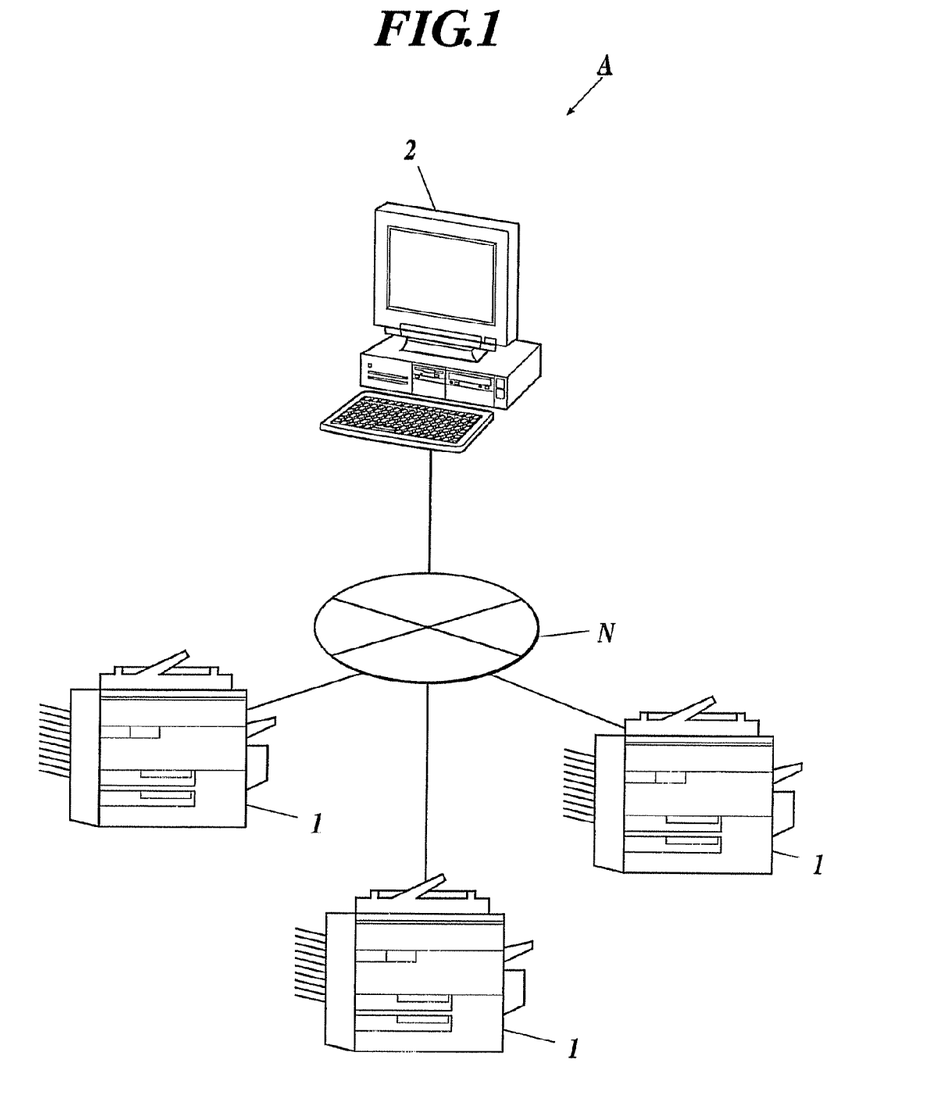
FIG. 1 shows a configuration of an image forming system according to preferred embodiments of the present invention.

FIG. 1 shows a configuration of an image forming system A according to preferred embodiments of the present invention.

As shown in FIG. 1, the image forming system A has an image forming apparatus 1 and an external device 2, and the respective devices are connected to each other through a network so that information can be mutually transmitted/ received therebetween. In FIG. 1, three image forming apparatuses 1 and one external device 2 are connected to one another, however, the numbers of apparatuses and devices are not limited to specific values.

Software for providing contents to be browsed on a browser or for browsing an operation screen using a browser is installed in the image forming apparatus 1. The image forming apparatus 1 has both an image forming function and a function as a browser and a web server, and executes processing in accordance with an operation instruction from an operating section of the image forming apparatus 1 or an operation instruction which is transmitted from the external device 2 or the like through the network N. The image forming apparatus 1 may be applied to a copying machine, a printer, a facsimile or a multi function peripheral (MFP) or the like.

The external device 2 is to browse the operation screen of the image forming apparatus 1 using a browser and to transmit an operation instruction to be executed on the operation screen to the image forming apparatus 1 for the purpose of remote supervision or remote control of the image forming apparatus 1. The external device 2 may be applied to an information processing device such as a general-purpose PC. In this embodiment, the external device 2 is provided on the assumption that a plurality of image forming apparatuses 1 are remote-controlled. On the contrary, it is possible to provide no external device 2.

The network N may be LAN (Local Area Network), WAN (Wide Area Network), or may include a telephone circuit network, ISDN (Integrated Services digital Network), a broad band communication line network, a dedicated line, a mobile communication network, a communication satellite line, CATV (Community Antenna Television) line, an optical communication line, a wireless communication line and an internet service provider for connecting them, etc.

Next, the image forming apparatus 1 will be described.

Figure 2:
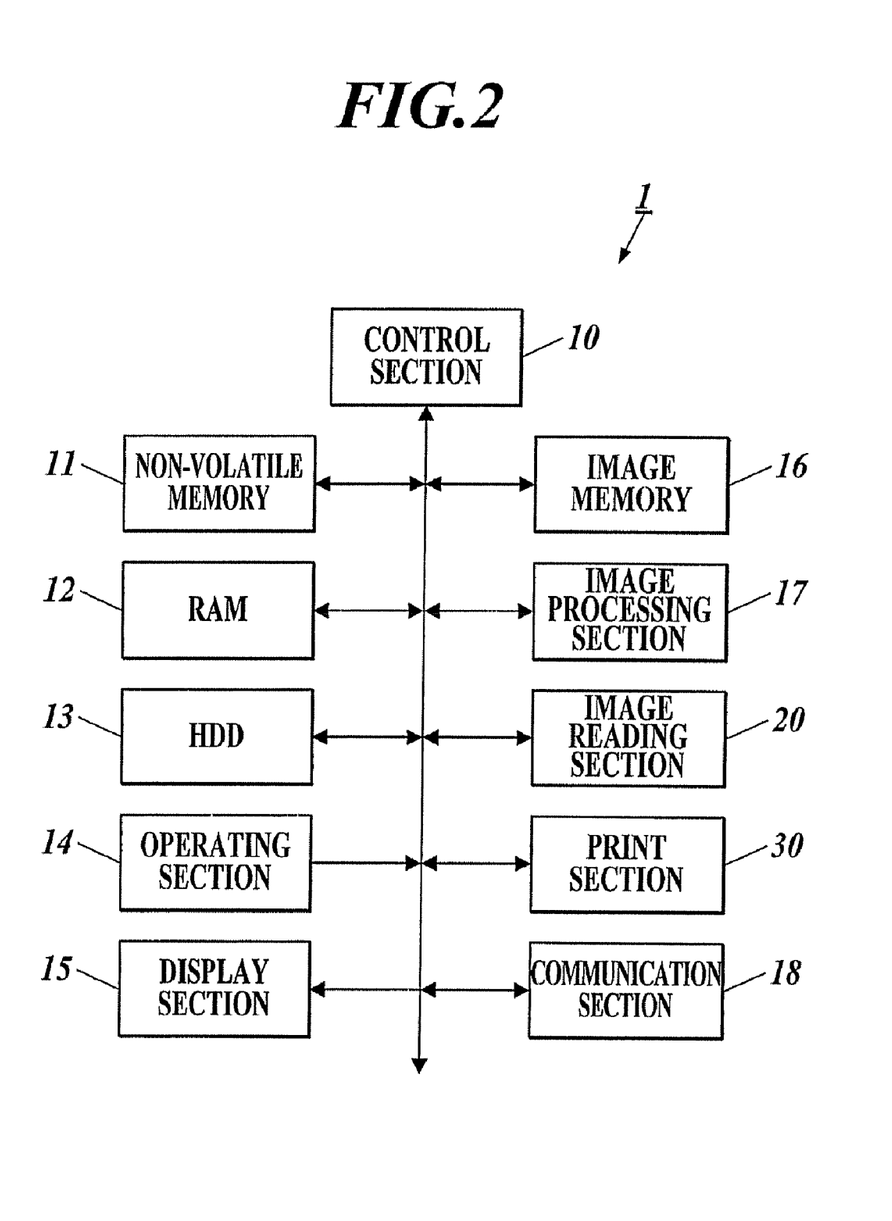
FIG. 2 shows an internal configuration of an image forming apparatus according to the preferred embodiments of the present invention.

FIG. 2 shows an internal configuration of the image forming apparatus 1 according to the present embodiments.

As shown in FIG. 2, the image forming apparatus includes a control section 10, a nonvolatile memory 11, a RAM (Random Access Memory) 12, an HDD (Hard Disc Drive) 13, an operating section 14, a display section 15, an image memory 16, an image processing section 17, a communication section 18, an image reading section 20, a print section 30, etc., and these sections are electrically connected to one another.

The control section 10 includes a CPU (Central Processing Unit), etc., loads a system program, various kinds of control programs and various kinds of data stored in the nonvolatile memory 11 into RAM 12, and controls the respective sections constituting the image forming apparatus in cooperation with these programs and the data.

Furthermore, when an instruction to read out one or more pieces of job information (hereinafter, the job information will be referred to as "job history data") is inputted from the operating section 14 or the external device 2 connected through the communication section 18, the control section 10 implements job history data output processing (described later). One piece of job history data includes job data of a job whose execution has been completed, and has a plurality of data items corresponding to a plurality of items. In the job history data output processing, the control section 10 extracts one or more of the data items corresponding to one or more of the items set in one of read-out definition files (described later) stored in the nonvolatile memory 11 from each of the pieces of job history data, and outputs the extracted one or more of the data items.

In the job history data output processing, when an instruction to select one of a plurality of definition files, an instruction as to whether one or more of the pieces of job history data to be read out are displayed at a destination device or not, and the date of one or more of the pieces of job history data to be read out are inputted by the operating section 14 or the external device 2, the control section 10 extracts one or more of the data items corresponding to one or more of the items set in the selected read-out definition file from each of the pieces of job history data corresponding to the date and outputs the extracted one or more of the data item, and also outputs a display conversion table and a display format section (a display language and a display format) which are contained in the definition file to the display section 15 or the external device 2.

The non-volatile memory 11 includes a non-volatile memory such as a ROM (Read Only Memory) and an HDD. The non-volatile memory 11 stores a system program, various kinds of control programs, a program for executing the job history data, output processing executed by the control section 10, data associated with these programs, and the definition files as a plurality of pieces of read-out definition information, etc. The non-volatile memory 11 functions as a second storage section.

Figure 3:
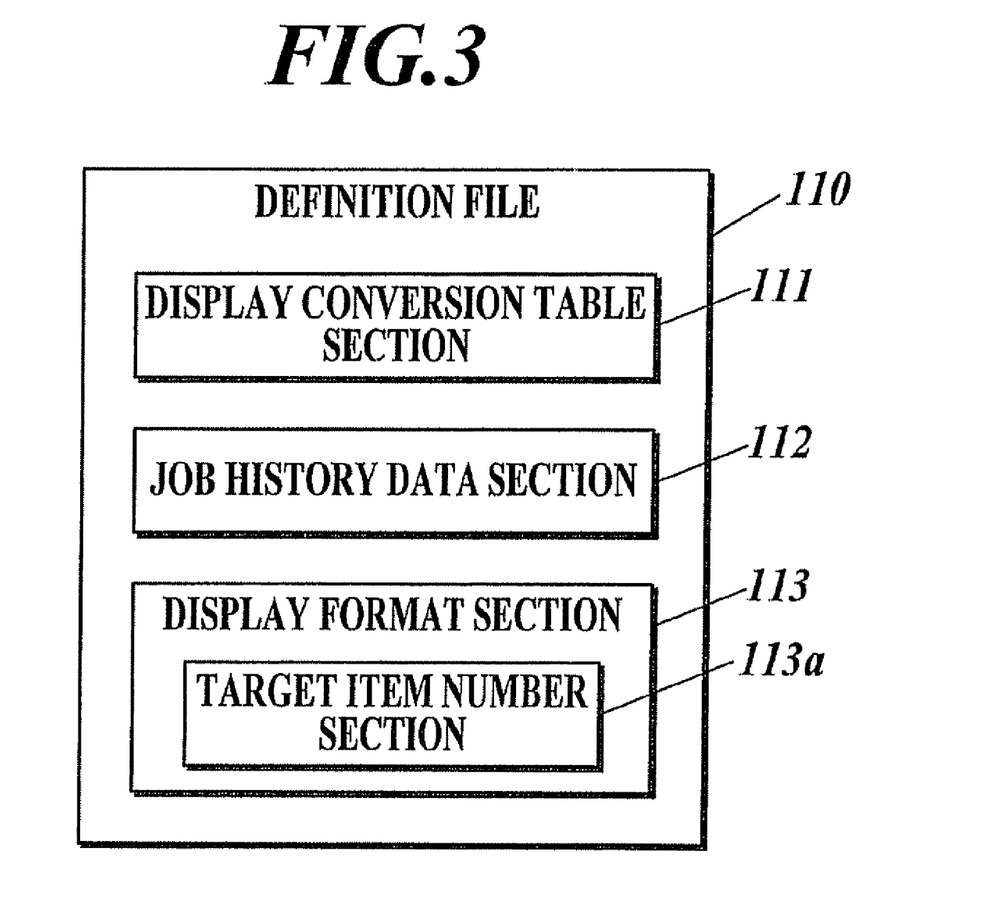
FIG. 3 shows a configuration example of a definition file stored in a nonvolatile memory of the image forming apparatus.

FIG. 3 shows an example of a configuration of the definition file.

As shown in FIG. 3, the definition file 110 has a display conversion table section 111, a job history data section 112 and a display format section 113 including a target item number section 113a in which one or more numbers for identifying one or more items to be read out from the job history data (hereinafter referred to as "target item number") are set.

The display conversion table section 111 is a conversion table for converting each target item number and a numerical value representing the data item corresponding to the target item number to character strings. For example, if the target item number is "04" and the data item corresponding to the target item number is "1" or "2", the target item number of "04" represents a power source, the data, item of "1" represents "ON", and the data item of "2" represents "OFF". That is, if the data item of the target item number "04" is "1", "04" and "1" are converted to "power ON". If the data item of the target item number of "04" is "2", "04" and "2" are converted to "power OFF".

The job history data section 112 is an area in which one or more of the data items extracted from each piece of job history data are stored.

The display format section 113 defines the target item number section 113a in which one or more target item numbers of one or more items to be read out are set, a display language of one or more data items corresponding to the one or more target item numbers set in the target item number section 113a (for example, html), and a display format of each of the data items based on the display language.

The definition file 110 is preset, or generated when an instruction to set an item number is accepted by the operating section 14 or the external device 2 and an instruction to set the accepted item number as a target item number to be read out from the job history data. The definition file 110 is stored in the non-volatile memory 11.

The RAM 12 provides a working area for temporarily storing various kinds of programs executed by the control section 10 and data associated with these programs. The RAM 12 includes a reserved job managing area, a job history managing area and an intermediate buffer. The reserved job managing area stores job data of a reserved job whose execution has not been completed. The job history managing area stores job data of a job whose execution has been completed as job history data. The intermediate buffer temporarily stores a preset number of pieces of job history data to be stored into the HDD 13.

The HDD 13 stores a plurality of history files as job information groups into which a plurality of pieces of job history data are classified by date. The HDD 13 is a non-volatile memory having a larger capacity for storing job history data than the RAM 12. The HDD 13 functions as a first storage section. The first storage section is not limited to an HDD.

Figure 4:
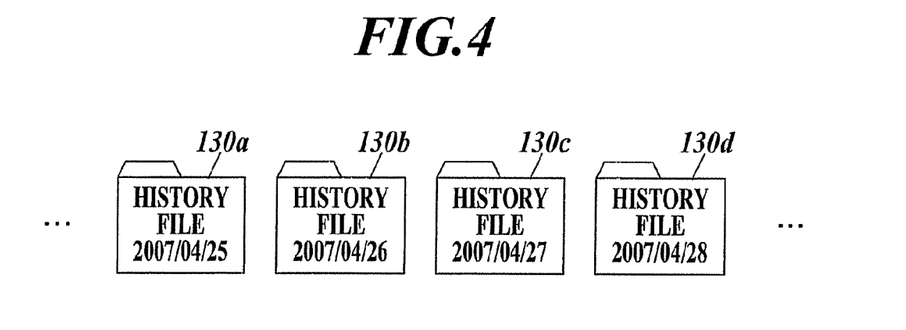
FIG. 4 shows an example of history files stored in an HDD of the image forming apparatus.
Figure 5:
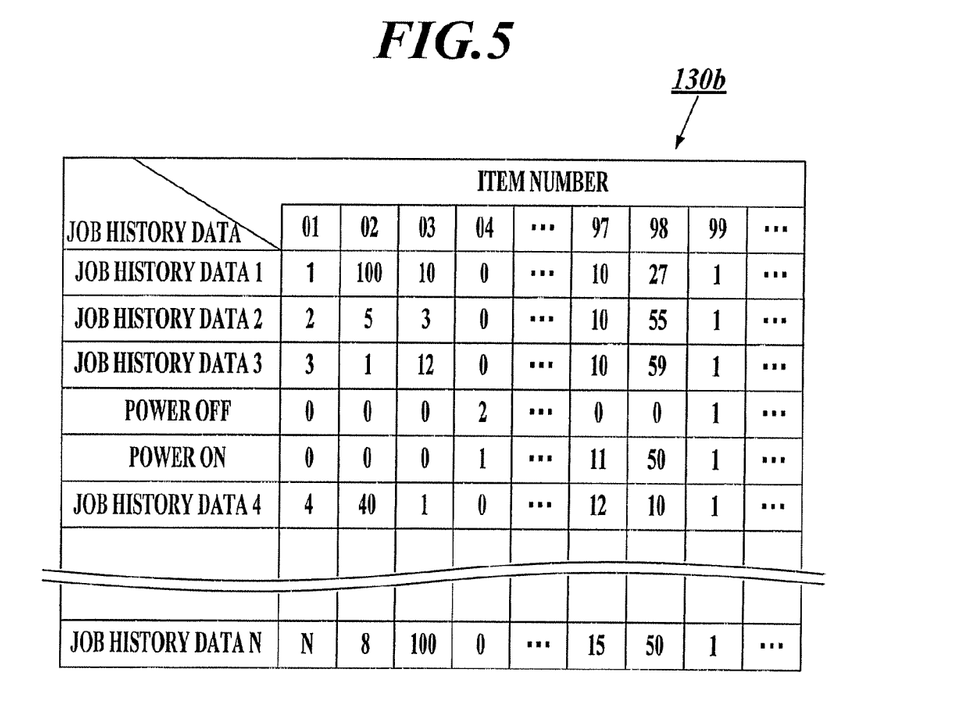
FIG. 5 shows an example of a data configuration in each of the history files.

FIG. 4 shows an example of history files 130a, 130b, 130c, 130d, . . . , stored in the HDD 13. FIG. 5 shows an example of a data configuration in the history file 130b shown in FIG. 4.

As shown in FIG. 4, the HDD 13 stores a plurality of history files 130a, 130b, 130c, 130d, . . . into which a plurality of pieces of job history data are classified by date.

As shown in FIG. 5, a plurality of pieces of job history data and information of ON/OFF of the power source of the image forming apparatus 1 are stored time sequentially. Each of the pieces of job history data includes a plurality of data items corresponding to a plurality of item numbers. The information of ON/OFF of the power source is handled as job history data. The item numbers are for identifying each of the items constituting the job history data. For example, "01" represents the identification number of a job, "02" represents the number of output sheets, "03" represents the number of copies of the output sheets. That is, the data item corresponding to each item number represents the state of the job corresponding to each item, the result of the job, etc.

The operating section 14 has various kinds of operating hard keys such as a copy start key, ten keys, etc., and outputs operation signals of these operation hard keys to the control section 10. The operating section 14 has a touch panel provided so as to cover an LCD of the display section 15. The operating section 14 detects a touched and indicated coordinate by a coordinate reading principle such as an electromagnetic induction system, a magnetostriction system, a pressure-sensitive system or the like, and outputs the detected coordinate to the control section 10. The operating section 14 accepts an instruction to read out one or more of the pieces of job history data stored in the HDD 13, date of one or more of the pieces of job history data to be read out, an instruction to select one of the definition files 110, and an instruction as to whether one or more of the pieces of job history data are displayed at a destination device. Thus, the operating section 14 functions as an input section.

The display section 15 includes a display screen such as an LCD (Liquid Crystal Display), and a VRAM (Video Random access Memory) for temporarily storing data for displaying an operation screen on the display screen, etc. The display section 15 displays various kinds of screens according to data written in the VRAM by the control section 10. For example, the display section 15 displays the extracted one or more of the data items of each of the pieces of job history data according to an instruction from the control section 10.

The image memory 16 is comprised of a DRAM (Dynamic RAM), and includes a compression memory for temporarily storing compressed image data, and a page memory for temporarily storing non-compressed image data to be printed before printing.

The image processing section 17 compresses image data outputted from the image reading section 20 or image data transmitted through the communication section 18 on the basis of an instruction from the control section 10, and writes and temporarily stores these compressed image data in the compression memory of the image memory 16.

The communication section 18 includes various kinds of interfaces such as NIC, a modem, USB, etc., and mutually transmits/receives information to/from an external device on a network N.

For example, the communication section 18 receives an instruction to read out one or more of the pieces of job history data stored in the HDD 13, date of one or more of the pieces of job history data to be read out, an instruction to select one of the definition files 110, and an instruction as to whether one or more of the pieces of job history data are displayed at a destination device, from the external device 2 connected through the network N. Thus, communication section 18 functions as the input section. The communication section 18 transmits the extracted one or more of the data items of each of the pieces of job history data, and the display conversion table section 111 and the display format section 113 of the selected definition file 110, to the external device 2.

The image reading section 20 includes a light source, a photoelectric conversion element such as a CCD (Charge Coupled Devices), etc. at the lower side of a contact glass. The image reading section 20 optically scans a document placed on the contact glass, photoelectrically coverts reflection light from the document by the CCD, and then conducts digital conversion to obtain image data of the document.

The print section 30 includes a paper feeding section (not shown) for feeding various kinds of sheets, and forms an image on an sheet on the basis of image data stored in a page memory in accordance with an print instruction by the control section 10. Any image forming method such as an electrophotographic method, an ink jetting method may be used.

Next, an operation of the present embodiments will be described.

Figure 6:
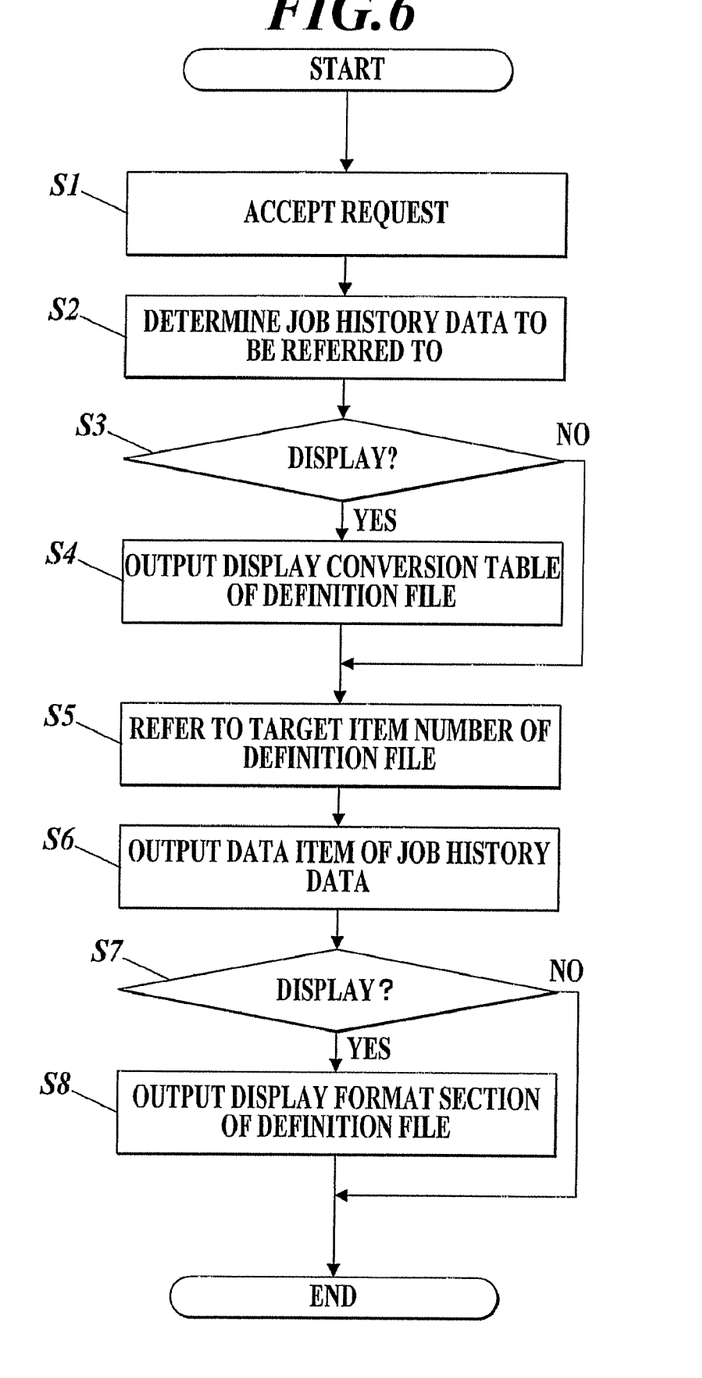
FIG. 6 shows a flowchart of a job history data output processing according to the preferred embodiments of the present invention.

FIG. 6 is a flowchart showing the job history data output processing according to the present embodiments.

The processing shown in FIG. 6 is executed in cooperation with the control section 10, the program of the job history data output processing stored in the non-volatile memory 11, the selected definition file 10, the RAM 12 and the HDD 13, etc.

The control section 10 accepts a request from the operating section 14 or the external device 2 connected through the communication section 18 (step S1). This request includes an instruction to read out one or more pieces of job history data, date of one or more pieces of job history data to be read out, an instruction to select one of the definition files 110, and an instruction as to whether one or more pieces of job history data are displayed at a destination device.

The control section 10 searches a history file corresponding to the date included in the request accepted in step S1 from the HDD 13, and determines one or more pieces of job history data to be read out, which are stored in the history file (step S2).

The control section 10 judges whether the request accepted in step S1 includes an instruction to display one or more pieces of job history data (step S3). If there is no instruction to display in the request (step S3: No), for example, when the one or more pieces of job history data are read out and downloaded, the processing goes to step S5.

If there is an instruction to display one or more pieces of job history data in the request (step S3; Yes), the control section 10 outputs the display conversion table section 111 constituting the definition file 110 which is accepted and selected in step S1, to a destination device (step S4).

When the request is accepted from the operating section 14, the destination device corresponds to the display section 15. When the request is accepted from the external device 2, the destination device corresponds to the external device 2. However, the destination device is not limited to the display section 15 or the external device 2.

The control section 10 refers to the target item number section 113a constituting the definition file 110 accepted and selected in step S1 (step S5), extracts one or more data items corresponding to one or more target item numbers set in the target item number section 113a, from each piece of job history data determined in step S2, and outputs the extracted one or more data items to the destination device (step S6).

The control section 10 judges whether the request accepted in step S1 includes an instruction to display one or more pieces of job history data (step S7). If there is no instruction to display in the request (step S7: No), for example, when the one or more pieces of job history data are read out and downloaded, the processing is finished.

If there is an instruction to display one or more pieces of job history data (step S7; Yes), the control section 10 outputs the display format section 113 constituting the definition file 110 accepted and selected in step S1, to the destination device (step S8), and then this processing is finished.

Since the output processing in steps S4, S6 and S8 are executed sequentially, the display conversion table section 111, the one or more data items and the display format section 113 seem to be collectively inputted to the destination device as viewed from the destination device.

Figure 7:
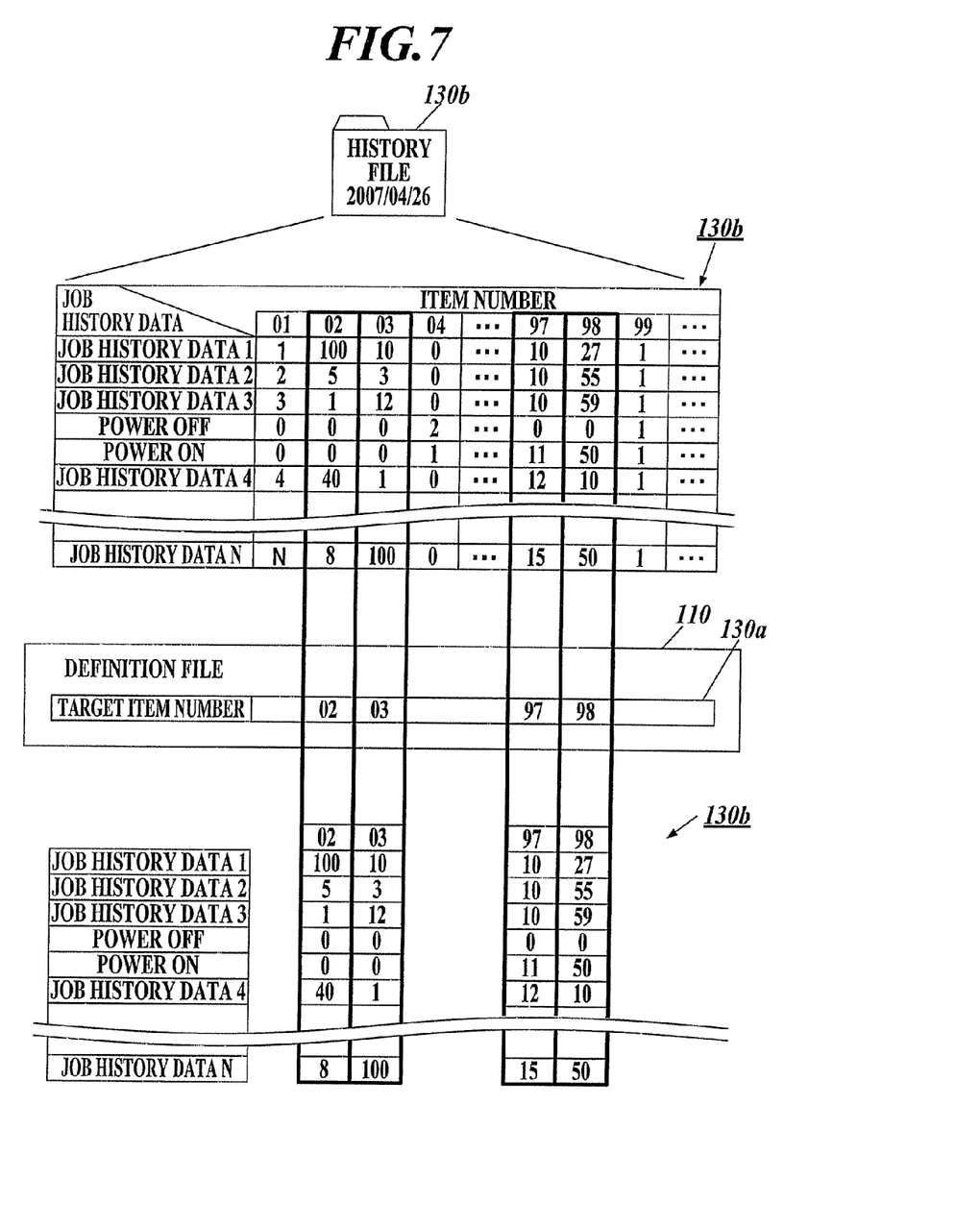
FIG. 7 is a schematic diagram showing an operation of extracting data items from job history data.

FIG. 7 is a schematic diagram showing an operation of extracting data items from job history data.

As shown in FIG. 7, the history file 130*b* corresponding to the date (for example, Apr. 26, 2007) contained in the accepted request is searched from the HDD 13.

A plurality of pieces of job history data stored in the history file 130*b* are determined to be read out.

Then, the target item number section 113*a* constituting the selected definition file 110 is referred to, and one or more data items corresponding to the target item numbers set in the target item number section 113*a* (for example, item numbers 02, 03, 97 and 98) are extracted from each piece of job history data of the history file 130*b*.

The one or more data items 131*b* corresponding to the target item numbers (that is, the extracted data items) are to be outputted to the destination device.

As described above, according to this embodiment, since one or more data items corresponding to the target item numbers set in the definition file are outputted as job history data, only necessary data items can be outputted without outputting any unwanted data items. Thus, the communication load can be reduced when one or more pieces of job history data are read out, and a speed of reading out the job history data can be increased.

Furthermore, when the request is accepted, a user can select the definition file 110 to be used for this processing from the plurality of definition files 110. Therefore, the data item to be extracted can be changed in accordance with an application of job history data to be read out, and thus the controllability of the read-out of job history data can be enhanced.

Furthermore, when an instruction to display one or more pieces of job history data is accepted, information necessary for displaying one or more data items (the display converting data section, the display format section) can be outputted. Thus, it is possible to display one or more data items constituting each piece of job history data at the output destination.

Because the HDD 13 stores a plurality of history files into which a plurality of pieces of job history data are classified by date, it is possible to easily read out one or more pieces of job history data on a date basis when the date of one or more pieces of job history data to be read out is accepted. Therefore, the communication load can be reduced.

Furthermore, since one or more data items extracted as job history data can be outputted to the external device 2 through the communication section 18, it is possible to reduce the communication load and to increase a speed of read-out when one or more pieces of job history data are transmitted to the external device 2.

The present invention is not limited to the above-described embodiments. It will be apparent that various changes may be made without departing from the scope of the invention.

According to one aspect of the preferred embodiments of the present invention, there is provided an image forming apparatus, comprising: a first storage section to store a plurality of pieces of job information each having a plurality of data items corresponding to a plurality of items; a second storage section to store read-out definition information in which one or more of the items to be read out from each of the pieces of job information are set; an input section to input an instruction to read out one or more of the pieces of job information; and a control section to extract one or more of the data items corresponding to one or more of the items set in the read-out definition information from each of the one or more of the pieces of job information when the instruction is inputted by the input section, and to output the extracted one or more of the data items.

According to another aspect of the preferred embodiments of the present invention, there is provided a management method of job information in an image forming apparatus including a first storage section to store a plurality of pieces of job information each having a plurality of data items corresponding to a plurality of items and a second storage section to store read-out definition information in which one or more of the items to be read out from each of the pieces of job information are set, the management method, comprising: accepting an instruction to read out one or more of the pieces of job information; extracting one or more of the data items corresponding to one or more of the items set in the read-out definition information from each of the one or more of the pieces of job information by referring the read-out definition information stored in the second storage section when the instruction is accepted; and outputting the extracted one or more of the data items.

Because one or more of the data items corresponding to one or more of the items set in the read-out definition information are outputted as job information, only necessary data items can be outputted without outputting any unwanted data items. Therefore, it is possible to reduce the communication load when the job information is read out, and to increase a speed of reading out the job information.

Preferably, the second storage section stores a plurality of pieces of read-out definition information, the input section further inputs an instruction to select one of the pieces of read-out definition information stored in the second storage section, and the control section extracts one or more of the data items corresponding to one or more of the items set in one of the pieces of read-out definition information selected through the input section and outputs the extracted one or more of the data items.

Preferably, the second storage section stores a plurality of pieces of read-out definition information, in the accepting, an instruction to select one of the pieces of read-out definition information stored in the second storage section is further accepted, and the extracting is performed by referring the selected read-out definition information.

Accordingly, since one of the pieces of read-out definition information can be selected, it is possible to change a data item to be extracted in accordance with an application of job information to be read out, and to enhance the controllability of reading out the job information.

Preferably, the read-out definition information includes a conversion table to convert each of the data items to a character string, and display format information including a display language of each of the data items, the input section further inputs an instruction as to whether one or more of the pieces of job information to be read out are displayed at a destination device, and the control section outputs the conversion table and the display format information together with the extracted one or more of the data items when the instruction to display one or more of the pieces of job information at the destination device is inputted by the input section.

Preferably, the read-out definition information includes a conversion table to convert each of the data items to a character string, and display format information including a display language of each of the data items, in the accepting, an instruction as to whether one or more of the pieces of job information to be read out are displayed at a destination device is further accepted, and in the outputting, the conversion table and the display format information are outputted together with the extracted one or more of the data items.

Accordingly, it is possible to display one or more of the pieces of job information at the destination device.

Preferably, the first storage section stores a plurality of job information groups into which the pieces of job information are classified by date, the input section further inputs date of one of the job information groups to be read out, and the control section extracts one or more of the data items corresponding to one or more of the items set in the read-out definition information from each piece of job information of one of the job information groups corresponding to the date inputted by the input section.

Preferably, the first storage section stores a plurality of job information groups into which the pieces of job information are classified by date, in the accepting, date of one of the job information groups to be read out is further accepted, and in the extracting, one or more of the data items corresponding to one or more of the items set in the read-out definition information are extracted from each piece of job information of one of the job information groups corresponding to the date.

As described above, because the first storage section stores a plurality of job information groups into which the pieces of job information are classified by date, it is possible to easily read out one or more pieces of job information on a date basis. Therefore, the communication load can be reduced.

Preferably, the image forming apparatus further comprises a communication section to communicate with an external device, wherein the control section outputs the extracted one or more of the data items to the external device through the communication section.

Preferably, in the outputting, the extracted one or more of the data items are outputted to an external device through a communication section of the image forming apparatus.

As described above, since one or more data items extracted as job information can be outputted to the external device, the load of the communication with the external device can be reduced, and a speed of read-out can be increased.

Preferably, the image forming apparatus further comprises a display section to display one or more of the pieces of job information, wherein the control section outputs the extracted one or more of the data items to the display section.

Preferably, in the outputting, the extracted one or more of the data items are outputted to a display section of the image forming apparatus.

The present U.S. patent application claims a priority under the Paris Convention of Japanese patent application No. 2007-151596 filed on Jun. 7, 2007 which shall be a basis of correction of an incorrect translation.

Although various exemplary embodiments have been shown and described, the invention is not limited to the embodiments shown. Therefore, the scope of the invention is intended to be limited solely by the scope of the claims that follow.

What is claimed is:

1. An image forming apparatus comprising:
a first storage section to store a plurality of pieces of job information each having a plurality of data items corresponding to a plurality of items;
a second storage section to store read-out definition information in which one or more of the items to be read out from each of the pieces of job information are set;
an input section to input an instruction to read out one or more of the pieces of job information; and
a control section to extract one or more of the data items corresponding to one or more of the items set in the read-out definition information from each of the one or more of the pieces of job information when the instruction is inputted by the input section, and to output the extracted one or more of the data items, wherein
the second storage section stores a plurality of pieces of read-out definition information,
the input section further inputs an instruction to select one of the pieces of read-out definition information stored in the second storage section, and
the control section extracts one or more of the data items corresponding to one or more of the items set in one of the pieces of read-out definition information selected through the input section and outputs the extracted one or more of the data items.

2. The image forming apparatus of claim 1, wherein
the read-out definition information includes a conversion table to convert each of the data items to a character string, and display format information including a display language of each of the data items,
the input section further inputs a display instruction as to whether one or more of the pieces of job information to be read out are to be displayed at a destination device, and
the control section outputs the conversion table and the display format information together with the extracted one or more of the data items when the display instruction indicates that one or more of the pieces of job information at the destination device is to be displayed.

3. The image forming apparatus of claim 1, further comprising a communication section to communicate with an external device, wherein the control section outputs the extracted one or more of the data items to the external device through the communication section.

4. The image forming apparatus of claim 1, further comprising a display section to display one or more of the pieces of job information, wherein the control section outputs the extracted one or more of the data items to the display section.

5. An image forming apparatus comprising:
a first storage section to store a plurality of pieces of job information each having a plurality of data items corresponding to a plurality of items;
a second storage section to store read-out definition information in which one or more of the items to be read out from each of the pieces of job information are set;
an input section to input an instruction to read out one or more of the pieces of job information; and
a control section to extract one or more of the data items corresponding to one or more of the items set in the read-out definition information from each of the one or more of the pieces of job information when the instruction is inputted by the input section, and to output the extracted one or more of the data items, wherein
the first storage section stores a plurality of job information groups into which the pieces of job information are classified by date, the input section further inputs date of one of the job information groups to be read out, and the control section extracts one or more of the data items corresponding to one or more of the items set in the read-out definition information from each piece of job information of one of the job information groups corresponding to the date inputted by the input section.

6. The image forming apparatus of claim 5, wherein the read-out definition information includes a conversion table to convert each of the data items to a character string, and display format information including a display language of each of the data items, the input section further inputs a display instruction as to whether one or more of the pieces of job information to be read out are to be displayed at a destination device, and the control section outputs the conversion table and the display format information together with the extracted one or more of the data items when the display instruction indicates that one or more of the pieces of job information at the destination device is to be displayed.

7. The image forming apparatus of claim 5, further comprising a communication section to communicate with an external device, wherein the control section outputs the extracted one or more of the data items to the external device through the communication section.

8. The image forming apparatus of claim 5, further comprising a display section to display one or more of the pieces of job information, wherein the control section outputs the extracted one or more of the data items to the display section.

9. A management method of job information, in an image forming apparatus including a first storage section to store a plurality of pieces of job information each having a plurality of data items corresponding to a plurality of items and a second storage section to store a plurality of pieces of read-out definition information in which one or more items to be read out from each of the pieces of job information are set, the management method comprising:

accepting an instruction to select one of the pieces of read-out definition information stored in the second storage section and accepting an instruction to read out one or more of the pieces of job information;

extracting one or more of the data items corresponding to one or more of the items set in the read-out definition information from each of the one or more of the pieces of job information by referring to the read-out definition information stored in the second storage section when the instruction to select is accepted, the extracting being performed by referring to the selected read-out definition information; and outputting the extracted one or more of the data items.

10. The management method of job information of claim 9, wherein the read-out definition information includes a conversion table to convert each of the data items to a character string, and display format information including a display language of each of the data items, in the accepting, an instruction as to whether one or more of the pieces of job information to be read out are displayed at a destination device is further accepted, and in the outputting, the conversion table and the display format information are outputted together with the extracted one or more of the data items.

11. The management method of job information of claim 9, wherein in the outputting, the extracted one or more of the data items are outputted to an external device through a communication section of the image forming apparatus.

12. The management method of job information of claim 9, wherein, in the outputting, the extracted one or more of the data items are outputted to a display section of the image forming apparatus.

13. A management method of job information in an image forming apparatus including a first storage section to store a plurality of pieces of job information each having a plurality of data items corresponding to a plurality of items and a plurality of job information groups into which the pieces of job information are classified by date, and a second storage section to store read-out definition information in which one or more of the items to be read out from each of the pieces of job information are set, the management method comprising:

accepting an instruction to read out one or more of the pieces of job information and further accepting a date of one of the job information groups to be read out, and extracting one or more of the data items corresponding to one or more of the items set in the read-out definition information from each of the one or more of the pieces of job information by referring to the read-out definition information stored in the second storage section when the instruction is accepted; and outputting the extracted one or more of the data items, wherein one or more of the data items corresponding to one or more of the items set in the read-out definition information are extracted from each piece of job information of one of the job information groups corresponding to the date.

14. The management method of job information of claim 13, wherein in the outputting, the extracted one or more of the data items are outputted to an external device through a communication section of the image forming apparatus.

15. The management method of job information of claim 13, wherein, in the outputting, the extracted one or more of the data items are outputted to a display section of the image forming apparatus.

16. The management method of job information of claim 13, wherein the read-out definition information includes a conversion table to convert each of the data items to a character string, and display format information including a display language of each of the data items, in the accepting, an instruction as to whether one or more of the pieces of job information to be read out are displayed at a destination device is further accepted, and in the outputting, the conversion table and the display format information are outputted together with the extracted one or more of the data items.

* * * * *